United States Patent
Tsuiki et al.

(10) Patent No.: US 12,381,434 B2
(45) Date of Patent: Aug. 5, 2025

(54) ARMATURE FOR ROTATING ELECTRIC MACHINE AND METHOD OF MANUFACTURING ARMATURE FOR ROTATING ELECTRIC MACHINE

(71) Applicant: Mitsubishi Electric Corporation, Tokyo (JP)

(72) Inventors: Hironori Tsuiki, Tokyo (JP); Kazuya Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 272 days.

(21) Appl. No.: 18/178,244

(22) Filed: Mar. 3, 2023

(65) Prior Publication Data

US 2023/0344298 A1 Oct. 26, 2023

(30) Foreign Application Priority Data

Apr. 21, 2022 (JP) .................................. 2022-069996

(51) Int. Cl.
*H02K 3/50* (2006.01)
*H02K 15/12* (2006.01)
*H02K 15/32* (2025.01)

(52) U.S. Cl.
CPC ............... *H02K 3/50* (2013.01); *H02K 15/12* (2013.01); *H02K 15/32* (2025.01); *H02K 2203/09* (2013.01)

(58) Field of Classification Search
None
See application file for complete search history.

(56) References Cited

U.S. PATENT DOCUMENTS

| | | | |
|---|---|---|---|
| 2003/0090166 A1* | 5/2003 | Kobayashi | H02K 3/522 310/144 |
| 2020/0303974 A1* | 9/2020 | Ishikawa | F04C 29/0085 |
| 2021/0367473 A1* | 11/2021 | Yoshimura | H02K 3/12 |

FOREIGN PATENT DOCUMENTS

| | | |
|---|---|---|
| JP | 6-44361 U | 6/1994 |
| JP | 9-200991 A | 7/1997 |
| JP | 11-18345 A | 1/1999 |
| JP | 2000-209802 A | 7/2000 |
| JP | 3921859 B2 | 5/2007 |

(Continued)

OTHER PUBLICATIONS

Japanese Office Action dated Mar. 28, 2023 in Japanese Application No. 2022-069996.

*Primary Examiner* — Terrance L Kenerly
(74) *Attorney, Agent, or Firm* — Sughrue Mion, PLLC

(57) ABSTRACT

Provided is an armature for a rotating electric machine, including: an armature core; and a plurality of windings, wherein the armature core includes a plurality of teeth, wherein each of the plurality of windings includes: a slot portion; and a coil end portion, wherein a coil terminal which is an end portion of each of the plurality of windings is formed on the coil end portion, wherein the armature further includes a wire connection plate including: a power feeding unit to which power is supplied from an outside; and a component having an insulating property and being integrated together with the power feeding unit, wherein the power feeding unit is joined to the coil terminal of at least one winding of the plurality of windings through a first connecting portion, and wherein the wire connection plate is fixed to the coil end portion.

12 Claims, 14 Drawing Sheets

(56) References Cited

FOREIGN PATENT DOCUMENTS

| | | |
|---|---|---|
| JP | 2009-124902 A | 6/2009 |
| JP | 5918392 B2 | 5/2016 |
| JP | 2017-103848 A | 6/2017 |
| JP | 2019-97371 A | 6/2019 |
| WO | 2014/061073 A1 | 4/2014 |

* cited by examiner

ARMATURE FOR ROTATING ELECTRIC MACHINE AND METHOD OF MANUFACTURING ARMATURE FOR ROTATING ELECTRIC MACHINE

BACKGROUND OF THE INVENTION

Field of the Invention

This disclosure relates to an armature for a rotating electric machine and a method of manufacturing the armature for a rotating electric machine.

Description of the Related Art

In Patent Literature 1, an insulation structure for a rotating electric machine is disclosed. The insulation structure includes a plurality of joining portions, an annular cap, and an insulating resin. Each of the joining portions is a portion at which conductor segments each forming a stator winding are joined to each other. The plurality of joining portions are arranged in an annular shape. The cap forms an annular chamber. The joining portions are accommodated in the chamber. The insulating resin is filled in the chamber. The joining portions are embedded by the insulating resin. With this, the insulation state between the joining portions or between the joining portion and another member can be kept.

CITATION LIST

Patent Literature

Patent Literature 1: JP 3921859 B2

In the above-mentioned insulation structure for a rotating electric machine, only the joining portions are embedded by the insulating resin. Thus, when a strong vibration is applied from the outside, large stress is generated in the joining portions, and the joining portions may be broken. Thus, there is a problem in that a vibration resistance is insufficient in the above-mentioned insulation structure.

SUMMARY OF THE INVENTION

This disclosure has been made to solve the problem as described above, and has an object to provide an armature for a rotating electric machine and a method of manufacturing the armature for a rotating electric machine, which can improve the vibration resistance.

According to at least one embodiment of this disclosure, there is provided an armature for a rotating electric machine, including: an armature core having an annular shape; and a plurality of windings mounted to the armature core, wherein the armature core includes a plurality of teeth, wherein a slot is formed between two teeth adjacent to each other among the plurality of teeth, wherein each of the plurality of windings includes: a slot portion accommodated in the slot; and a coil end portion arranged on an outer side of the slot in an axial direction of the armature core, wherein a coil terminal which is an end portion of each of the plurality of windings is formed on the coil end portion, wherein the armature further includes a wire connection plate including: a power feeding unit to which power is supplied from an outside; and a component having an insulating property and being integrated together with the power feeding unit, wherein the power feeding unit is joined to the coil terminal of at least one winding of the plurality of windings through a first connecting portion, and wherein the wire connection plate is fixed to the coil end portion.

According to at least one embodiment of this disclosure, there is provided a method of manufacturing the armature for a rotating electric machine according to this disclosure, the method including: mounting the wire connection plate to the coil end portion such that the second connecting portion is accommodated in the recessed portion, and joining the power feeding unit to the coil terminal of the at least one winding; filling a resin in the recessed portion under a state in which the wire connection plate is located below the armature core; and curing the resin under a state in which the wire connection plate remains located below the armature core to form the resin member.

According to at least one embodiment of this disclosure, the vibration resistance of the armature for a rotating electric machine can be improved.

DESCRIPTION OF THE EMBODIMENTS

First Embodiment

An armature for a rotating electric machine and a method of manufacturing the armature for a rotating electric machine according to a first embodiment are described. In this embodiment, an electric motor for an automobile is described as the rotating electric machine. However, the rotating electric machine may be electric motors for machines other than an automobile or may be a generator.

Figure 1:
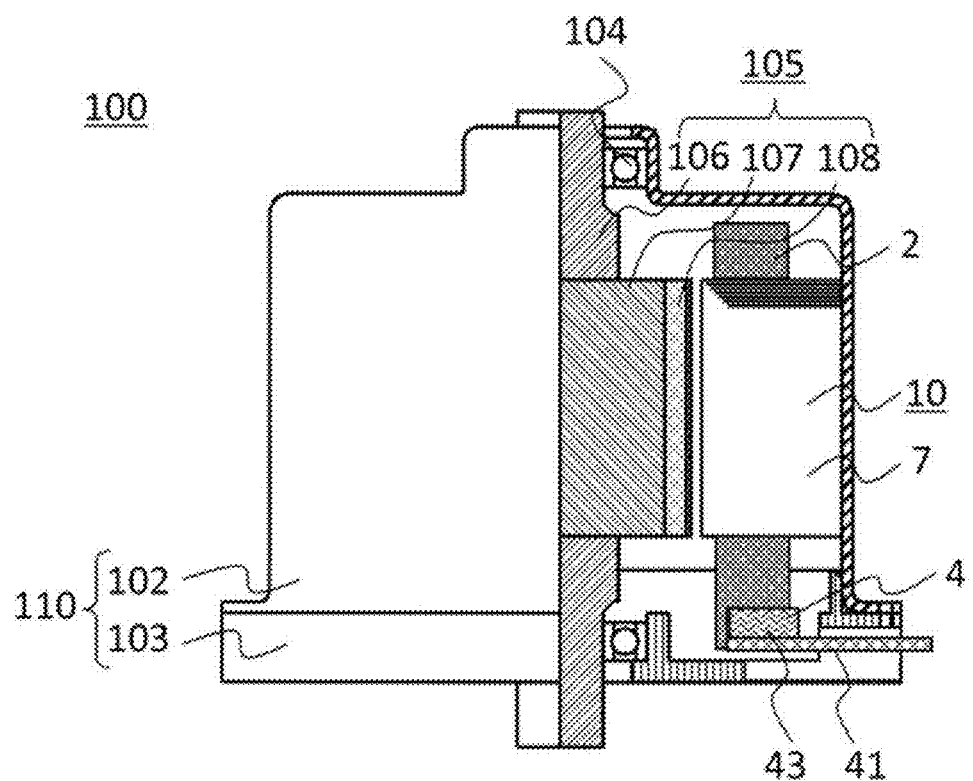
FIG. 1 is a schematic one-side sectional view for illustrating a configuration of a rotating electric machine according to a first embodiment.

FIG. 1 is a schematic one-side sectional view for illustrating a configuration of the rotating electric machine according to this embodiment. As illustrated in FIG. 1, a rotating electric machine 100 includes a housing 110, an armature 10, and a rotor 105.

In the following description, a direction along the center axis of an armature core 7 of the armature 10 may be referred to as "axial direction of the armature core" or simply referred to as "axial direction." A direction along a circumference around the center axis of the armature core 7 in a cross section perpendicular to the axial direction may be referred to as "circumferential direction of the armature core" or simply referred to as "circumferential direction." A direction along a radius of the armature core 7 in the same cross section may be referred to as "radial direction of the armature core" or simply referred to as "radial direction."

The housing 110 includes a frame 102 and an end plate 103. The frame 102 has a cylindrical shape including a bottom portion. An opening portion of the frame 102 is closed by the end plate 103.

The armature 10 is fixed to an inner side of the cylindrical portion of the frame 102. A power feeding unit 41 protrudes to the outside from the armature 10. The power feeding unit 41 feeds power from an external power source such as an inverter to the armature 10. The power feeding unit 41 has a plurality of terminals. The power feeding unit 41 is mechanically and electrically connected to the external power source by screwing or the like.

The rotor 105 is provided on an inner side of the armature 10 in the radial direction. The rotor 105 is rotatably supported on the bottom portion of the frame 102 and the end plate 103 through intermediation of a bearing 104.

The rotor 105 is a permanent magnet rotor including a rotation shaft 106, a rotor core 107, and a plurality of permanent magnets 108. The rotor core 107 is fixed to the rotation shaft 106. The permanent magnets 108 are embedded in the rotor core 107. The permanent magnets 108 are arranged on an outer peripheral surface side of the rotor core 107. The permanent magnets 108 are arranged at a predetermined pitch in the circumferential direction. Each of the permanent magnets 108 forms a magnetic pole of the rotor 105.

The rotor 105 is not limited to the permanent magnet rotor. The rotor 105 may be a squirrel-cage rotor in which an uninsulated rotor conductor is accommodated in slots of the rotor core, and both ends of the rotor conductor are short-circuited by a short circuit ring. Further, the rotor 105 may be a winding rotor in which an insulated conductor line is mounted to the slots of the rotor core.

Figure 2:
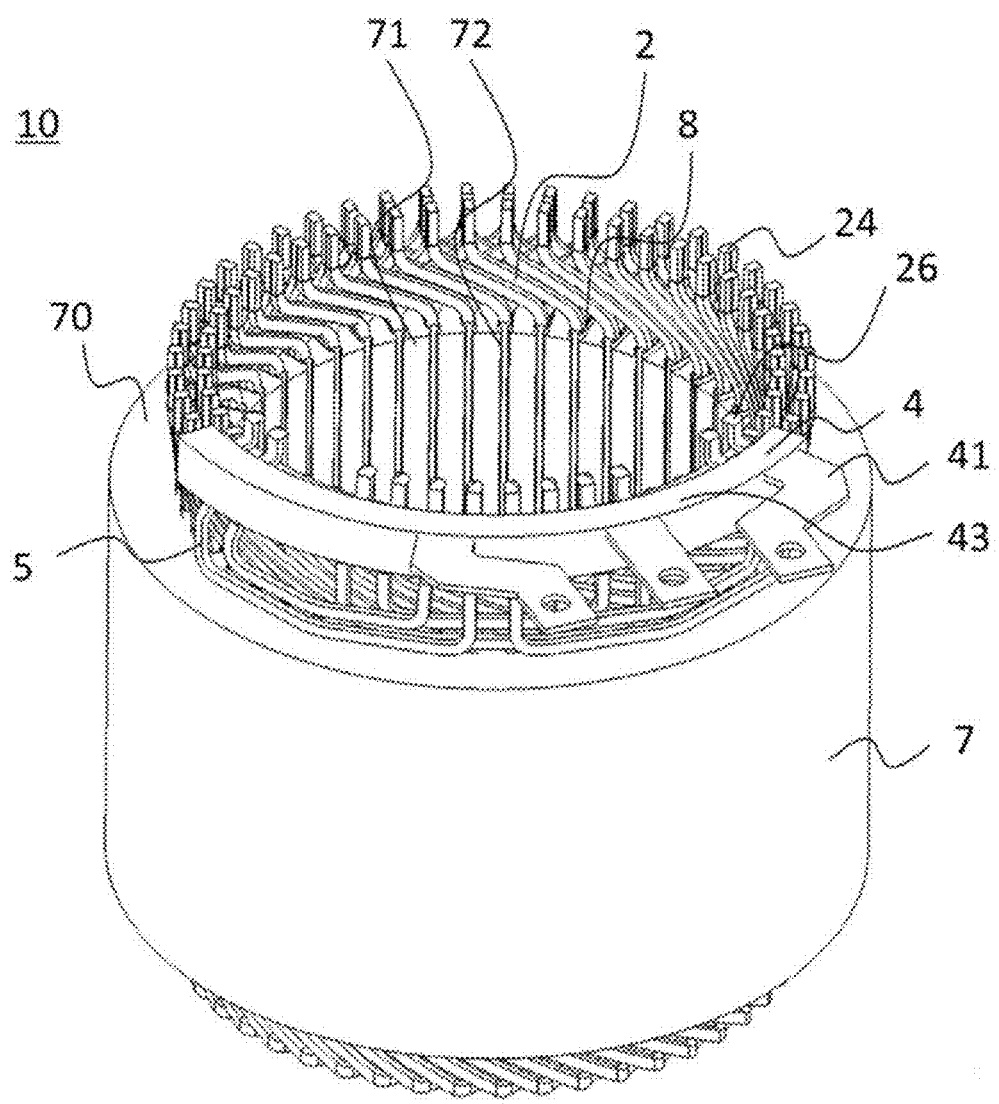
FIG. 2 is a perspective view for illustrating a configuration of an armature for a rotating electric machine according to the first embodiment.

FIG. 2 is a perspective view for illustrating a configuration of the armature for a rotating electric machine according to this embodiment. As illustrated in FIG. 2, the armature 10 includes the armature core 7, windings 2, a wire connection plate 4, and joints 5.

The armature core 7 has an annular shape. The armature core 7 includes a yoke 70 and a plurality of teeth 71. The yoke 70 has an annular shape. Each of the plurality of teeth 71 protrudes from the yoke 70 toward the inner side in the radial direction. The plurality of teeth 71 are coupled to each other by the yoke 70. Slots 72 are each formed between two teeth 71 adjacent to each other in the circumferential direction. The armature core 7 is formed by laminating a plurality of steel sheets.

The windings 2 are mounted to the armature core 7. An insulating sheet 8 is sandwiched between the winding 2 and the armature core 7. The insulating sheet 8 is formed of, for example, an insulating material, such as polyethylene terephthalate (PET), polyphenylene sulfide (PPS), or aramid fiber. The winding 2 and the armature core 7 are electrically insulated from each other by the insulating sheet 8.

Figure 3:
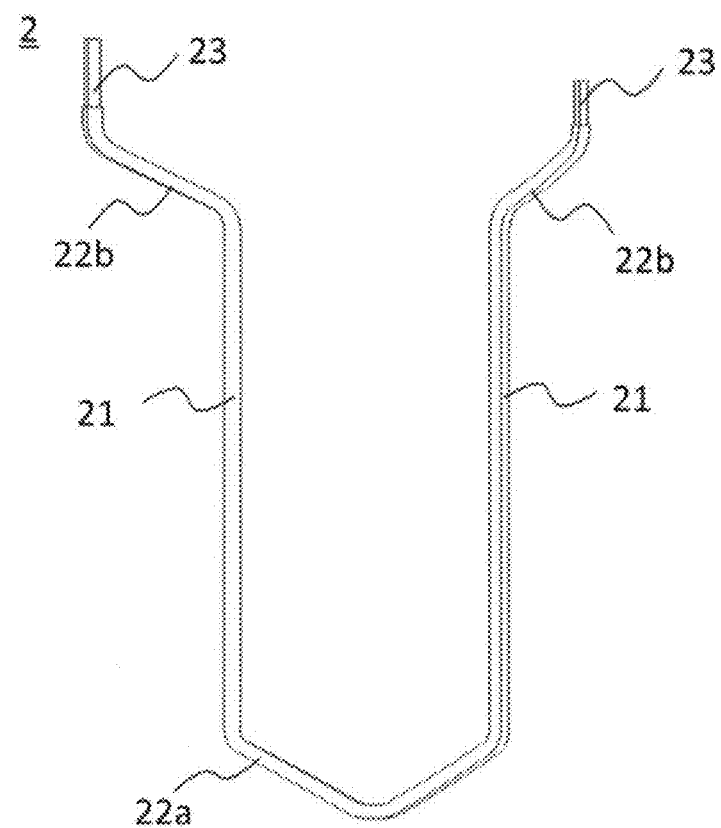
FIG. 3 is a perspective view for illustrating a configuration of a winding in the armature for a rotating electric machine according to the first embodiment.

FIG. 3 is a perspective view for illustrating a configuration of the winding in the armature for a rotating electric machine according to this embodiment. As illustrated in FIG. 3, the winding 2 includes two slot portions 21, a coil end portion 22a, and coil end portions 22b. Each of the slot portions 21 is a portion to be accommodated in the slot 72.

The coil end portion 22a and the coil end portions 22b are portions to be arranged on outer sides of the slot 72 in the axial direction. The coil end portion 22a is arranged on one side in the axial direction of the armature core 7. The coil end portions 22b are arranged on the other side in the axial direction of the armature core 7. The two slot portions 21 are connected to each other by the coil end portion 22a.

A coil terminal 23, which serves as an end portion of the winding 2, is formed on the coil end portion 22b. The coil terminal 23 extends along the axial direction of the armature core 7. As illustrated in FIG. 2, the coil terminal 23 is electrically connected to a coil terminal 23 of another winding 2 or to the joint 5.

A phase winding of each phase is formed by a plurality of windings 2 arranged in a wave winding manner. That is, the winding 2 is a coil segment forming a part of the phase winding. The winding 2 arranged on the outer side in the radial direction of the armature core 7 is sequentially connected to another winding 2 arranged on the inner side in the radial direction. The winding 2 arranged on the inner side in the radial direction of the armature core 7 is sequentially connected to another winding 2 arranged on the outer side in the radial direction. The armature 10 is configured to generate a rotating magnetic field by causing current to flow through the phase winding of each phase.

In the following description, a connecting portion at which two windings 2 are connected to each other is referred to as a connecting portion 24. Further, a connecting portion at which the winding 2 and the joint 5 are connected to each other is referred to as a connecting portion 25.

The joint 5 is a conductive member for electrically connecting two windings 2 to each other. The joint 5 has a U-shaped cross section. One end of the joint 5 is joined to the coil terminal 23 of the winding 2. The other end of the joint 5 is joined to the coil terminal 23 of another winding 2. The coil terminals 23 apart from each other in the circumferential direction are electrically connected to each other by the joint 5. The joint 5 is provided on the outer side with respect to the coil end portion 22*b* in the radial direction of the armature core 7.

Figure 4:
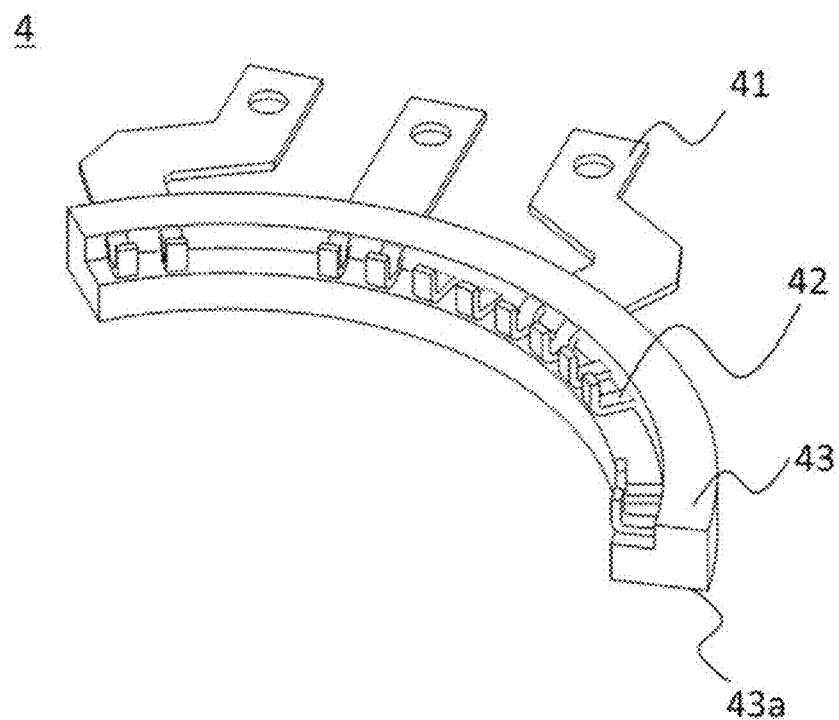
FIG. 4 is a perspective view for illustrating a configuration of a wire connection plate in the armature for a rotating electric machine according to the first embodiment.

FIG. 4 is a perspective view for illustrating a configuration of the wire connection plate in the armature for a rotating electric machine according to this embodiment. The armature 10 of this embodiment has a configuration in which three phase windings are connected in Y connection. As illustrated in FIG. 4, the wire connection plate 4 includes the power feeding unit 41, a neutral point bus bar 42, and a component 43 made of a resin. The component 43 has an electrical insulating property. The component 43 is integrated together with the power feeding unit 41 and the neutral point bus bar 42. The power feeding unit 41, the neutral point bus bar 42, and the component 43 are fixed to each other.

Power is supplied to the power feeding unit 41 from the external power source such as an inverter. The power feeding unit 41 includes three terminals. The neutral point bus bar 42 forms a neutral point at which the phase winding of each phase is connected. The three terminals of the power feeding unit 41 and the neutral point bus bar 42 are electrically insulated from each other. The three terminals of the power feeding unit 41 and the neutral point bus bar 42 are each electrically connected to the winding 2 in a connecting portion 26.

The component 43 is made of, for example, a resin which can be subjected to injection molding. Examples of the resin which can be subjected to injection molding include polyphenylene sulfide, polybutylene terephthalate (PBT), and polyoxymethylene (POM). The component 43 is formed by injection molding, and then, is assembled together with the power feeding unit 41 and the neutral point bus bar 42. Alternatively, the component 43 may be formed integrally with the power feeding unit 41 and the neutral point bus bar 42 by casting the power feeding unit 41 and the neutral point bus bar 42.

The component 43 has an arc shape along arrangement of a plurality of connecting portions 25. That is, the component 43 has an arc shape along arrangement of the coil terminals 23 located at the end portions on the outer side in the radial direction or the end portions on the inner side in the radial direction. The component 43 has a surface 43*a* opposed to the coil end portions 22*b*. The surface 43*a* is arranged so as to be perpendicular to the axial direction of the armature core 7.

Figure 5:
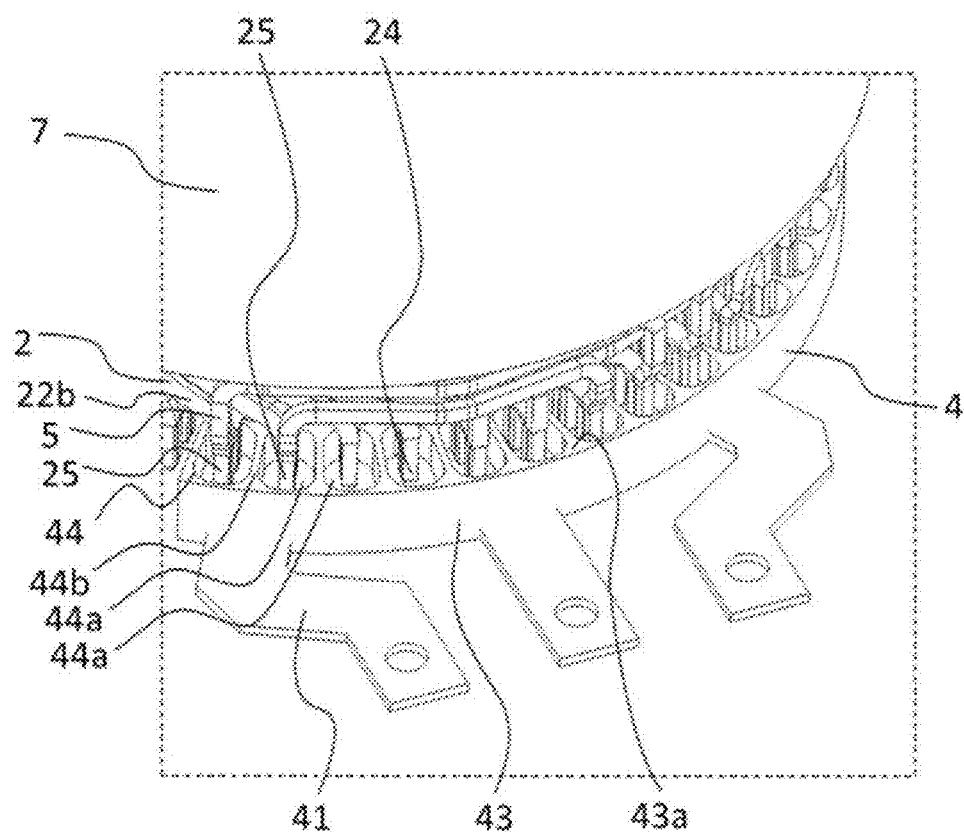
FIG. 5 is a perspective view for illustrating a configuration of a main part of the armature for a rotating electric machine according to the first embodiment.

FIG. 5 is a perspective view for illustrating a configuration of a main part of the armature for a rotating electric machine according to this embodiment. The up-and-down direction of FIG. 5 is opposite to the up-and-down direction of FIG. 2. As illustrated in FIG. 5, the component 43 of the wire connection plate 4 has a recessed portion 44 formed therein. The recessed portion 44 is formed in the surface 43*a* of the component 43.

The recessed portion 44 includes a plurality of chambers 44*a*. The plurality of chambers 44*a* are arrayed in the circumferential direction. Two chambers 44*a* adjacent to each other in the circumferential direction are partitioned by a first wall 44*b*. The connecting portion 24 and the connecting portion 25 are accommodated in each chamber 44*a*. In this embodiment, all the connecting portions 25 and a part of the connecting portions 24 are accommodated in any of the chambers 44*a*. One connecting portion 25 and one connecting portion 24 or two connecting portions 24 are accommodated in each chamber 44*a*.

Figure 6:
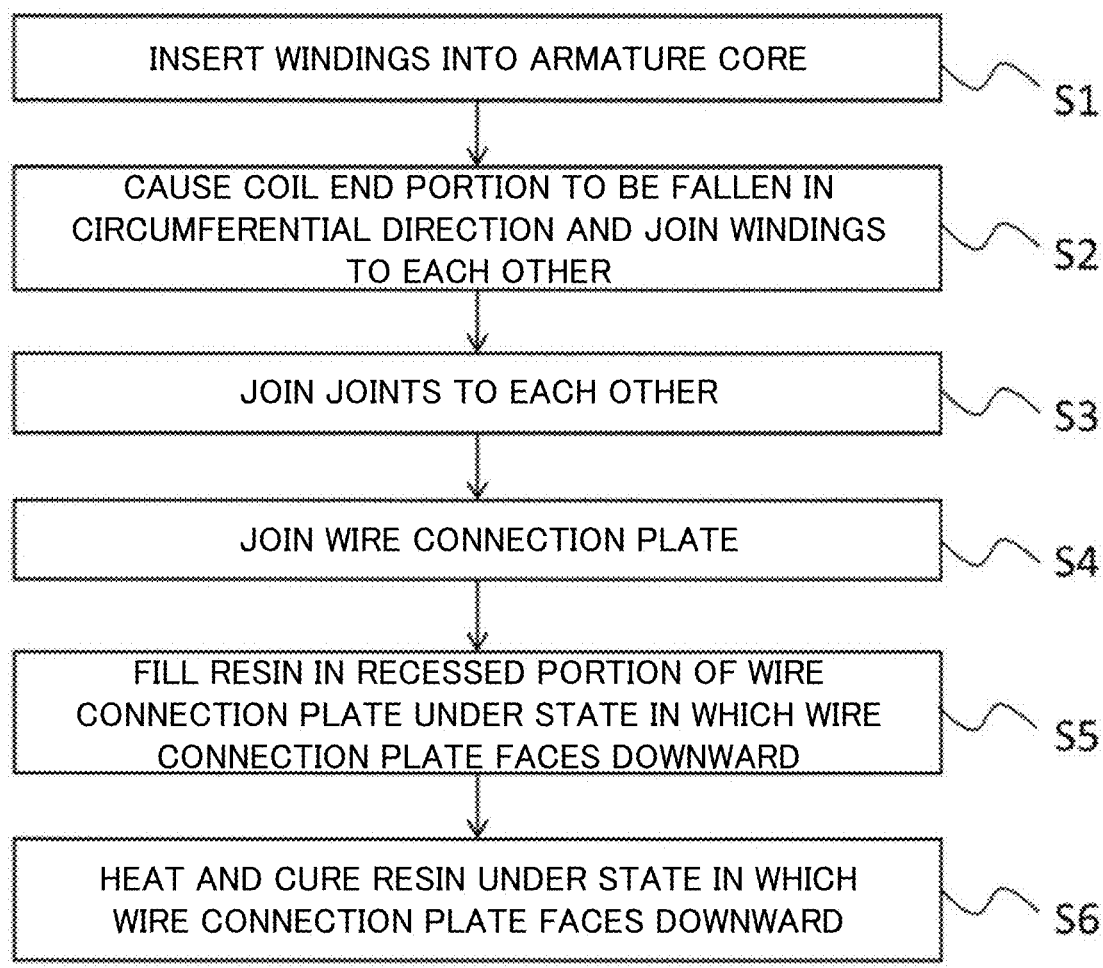
FIG. 6 is a flowchart for illustrating a flow of manufacturing processes for the armature for a rotating electric machine according to the first embodiment.

Next, the method of manufacturing the armature 10 is described with reference to FIG. 6 to FIG. 11. FIG. 6 is a flowchart for illustrating a flow of manufacturing processes for the armature for a rotating electric machine according to this embodiment. FIG. 7 to FIG. 11 are perspective views for illustrating the manufacturing processes for the armature for a rotating electric machine according to this embodiment.

Figure 7:
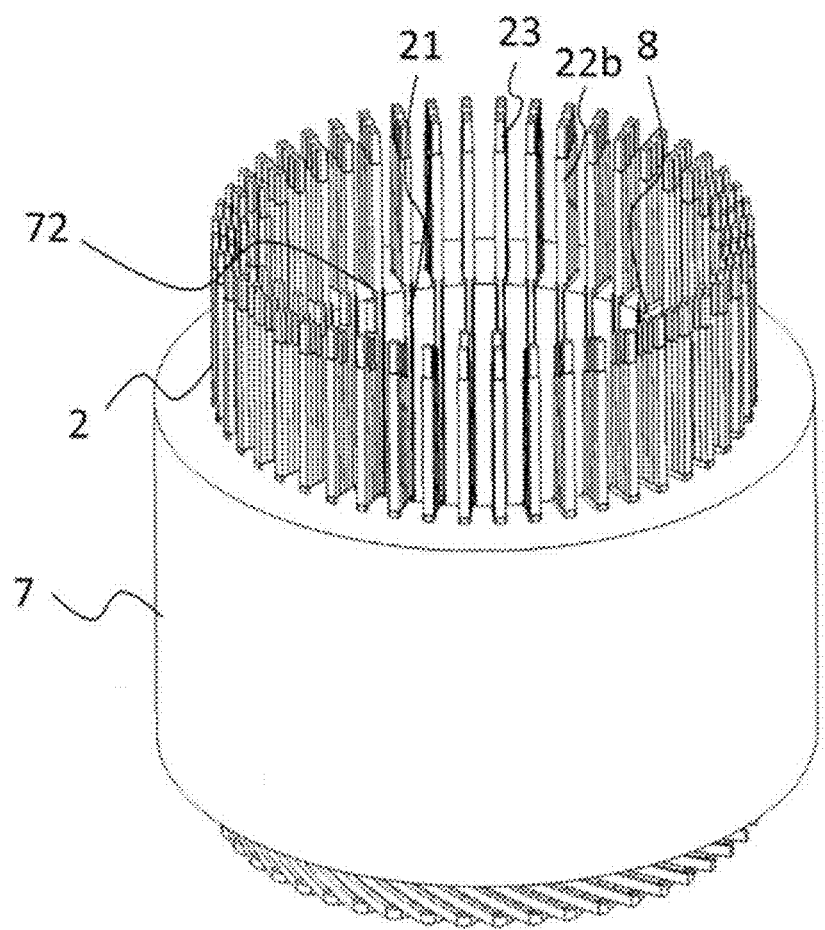
FIG. 7 is a perspective view for illustrating a manufacturing process for the armature for a rotating electric machine according to the first embodiment.

First, in Step S1 of FIG. 6, the windings 2 are inserted into the armature core 7. That is, as illustrated in FIG. 7, the insulating sheets 8 are inserted into the slots 72 of the armature core 7. After that, the bundle of the plurality of windings 2 is inserted into the armature core 7. Each winding 2 is formed in a U shape. Each winding 2 is inserted into the slot 72 from one side in the axial direction of the armature core 7, that is, the lower side of FIG. 7 with the coil terminals 23 at the head. With this, the slot portions 21 of each winding 2 are accommodated in the slot 72. The plurality of slot portions 21 are arranged in each slot 72 along the radial direction. The coil end portions 22*b* and the coil terminals 23 of each winding 2 are arranged on the other side in the axial direction of the armature core 7, that is, the upper side of FIG. 7.

Figure 8:
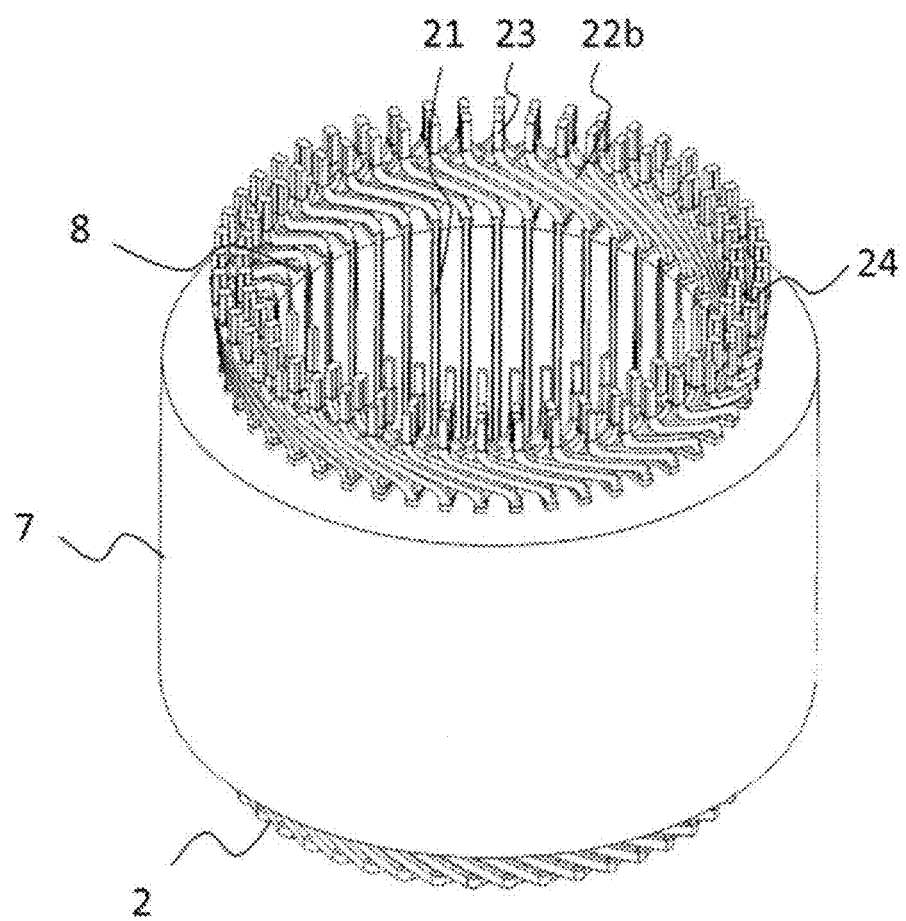
FIG. 8 is a perspective view for illustrating a manufacturing process for the armature for a rotating electric machine according to the first embodiment.

Next, in Step S2 of FIG. 6, the coil end portions 22*b* are caused to be fallen in the circumferential direction, and the windings 2 are joined to each other. That is, as illustrated in FIG. 8, root sides of the coil end portions 22*b* of each winding 2 are bent in the circumferential direction at a predetermined angle. Further, distal end sides of the coil end portions 22*b* of each winding 2 are bent in an opposite direction. With this, each winding 2 has a shape as illustrated in FIG. 3. The coil terminals 23 of each winding 2 extend in the axial direction of the armature core 7.

After that, two coil terminals 23 adjacent to each other in the radial direction are joined to each other to form the connecting portion 24. The coil terminals 23 may be joined to each other by welding, caulking with heating, or brazing. At this time, the windings 2 are connected to each other in a spiral manner such that the connecting portions 24 are arranged in a concentrated manner on the outer side in the radial direction and the inner side in the radial direction.

Figure 9:
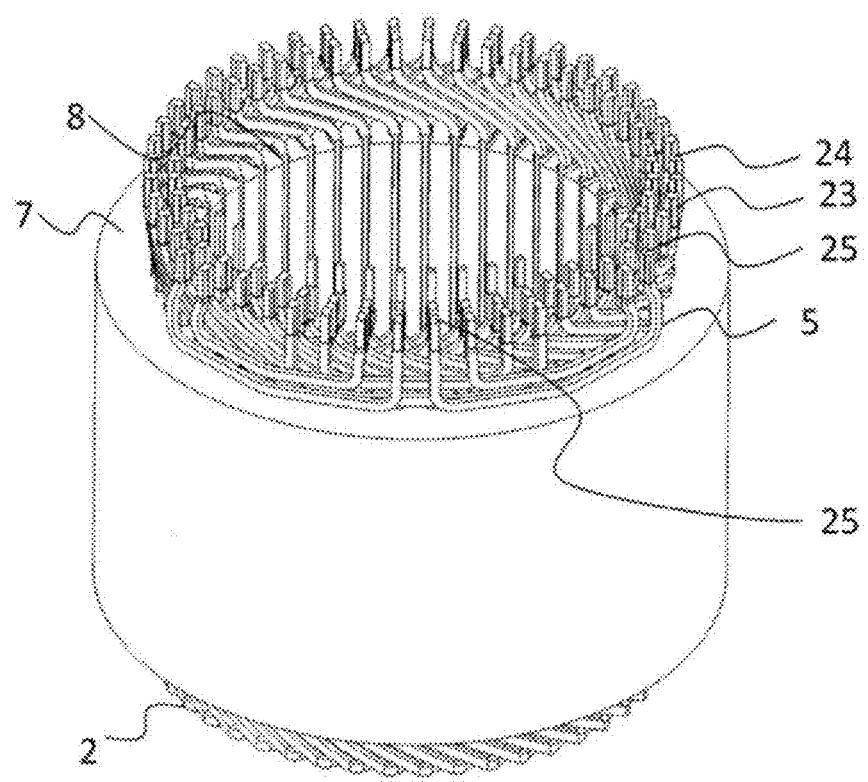
FIG. 9 is a perspective view for illustrating a manufacturing process for the armature for a rotating electric machine according to the first embodiment.

Next, in Step S3 of FIG. 6, the joints 5 are joined to each other. That is, as illustrated in FIG. 9, one end of the joint 5 is joined to the coil terminal 23 located at the end portion on the outer side in the radial direction among the plurality of coil terminals 23 from the outer side in the radial direction. Further, the other end of the joint 5 is joined to another coil terminal 23 located at the end portion on the outer side in the radial direction among the plurality of coil terminals 23 from the outer side in the radial direction. With this, each of one end and the other end of the joint 5 is joined to the coil terminal 23 of the winding 2 through the connecting portion 25. In this embodiment, the joint 5 is joined to two coil terminals 23 located at the end portions on the outer side in the radial direction, but the joint 5 may be joined to two coil terminals 23 located at the end portions on the inner side in the radial direction.

Figure 10:
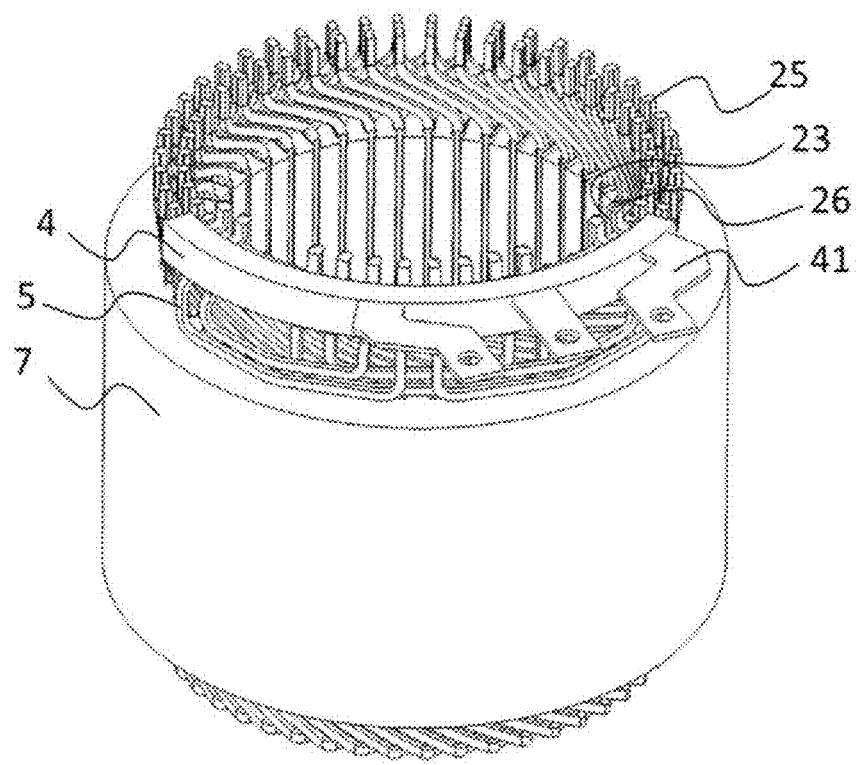
FIG. 10 is a perspective view for illustrating a manufacturing process for the armature for a rotating electric machine according to the first embodiment.

Next, in Step S4 of FIG. 6, the wire connection plate 4 is joined. That is, as illustrated in FIG. 10, the wire connection plate 4 is arranged on the coil end portions 22*b* from the other side in the axial direction of the armature core 7, that is, the upper side of FIG. 10. At this time, the connecting portions 24 and the connecting portions 25 are accommodated in the recessed portion 44 formed in the component 43. Then, each terminal of the power feeding unit 41 and the coil terminal 23 located at the end portion on the inner side in the radial direction among the plurality of coil terminals 23 are joined to each other to form the connecting portion 26. The power feeding unit 41 and the coil terminal 23 may be joined to each other by welding, caulking with heating, or brazing. When the joint 5 is joined to two coil terminals 23 located at the end portions on the inner side in the radial direction, each terminal of the power feeding unit 41 may be joined to the coil terminal 23 located at the end portion on the outer side in the radial direction.

Figure 11:
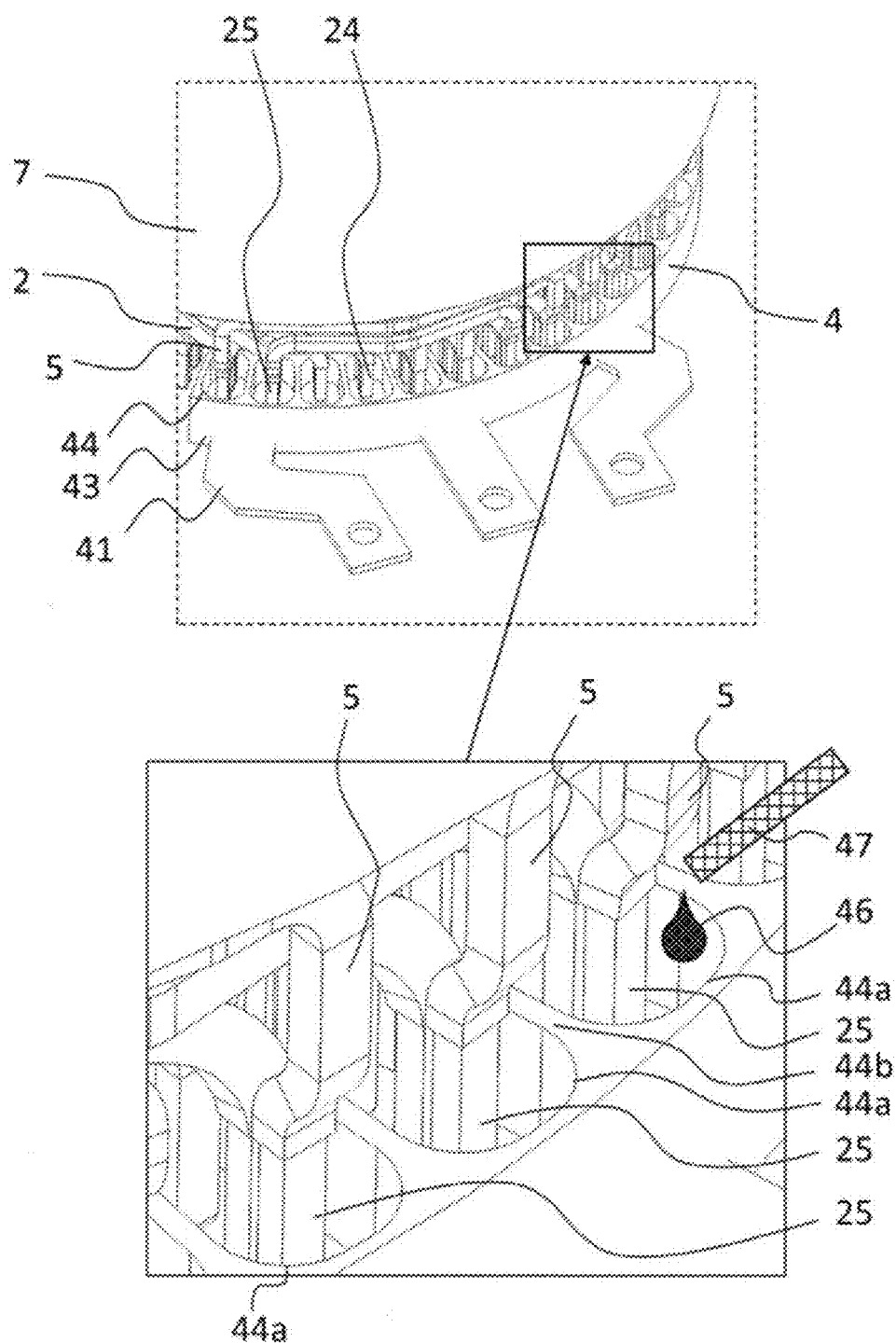
FIG. 11 is a perspective view for illustrating a manufacturing process for the armature for a rotating electric machine according to the first embodiment.

Next, in Step S5 of FIG. 6, a resin is filled in the recessed portion 44 of the wire connection plate 4 under a state in which the wire connection plate 4 faces downward. That is, as illustrated in FIG. 11, the posture of the armature 10 is reversed such that the wire connection plate 4 is located below the armature core 7. With this, the opening of the recessed portion 44 faces upward. Next, a resin 46 is filled in the recessed portion 44 using a dispenser 47 or the like under a state in which the wire connection plate 4 is located below the armature core 7. A thermosetting adhesive or the like is used as the resin 46.

Next, in Step S6 of FIG. 6, the resin 46 is heated and cured under a state in which the wire connection plate 4 faces downward. That is, the resin 46 is heated and cured under a state in which the wire connection plate 4 remains located below the armature core 7. With this, the resin 46 is cured to form a resin member. The connecting portions 24 and the connecting portions 25 are covered by the resin member. Through the processes as described above, the armature 10 is manufactured.

Figure 12:
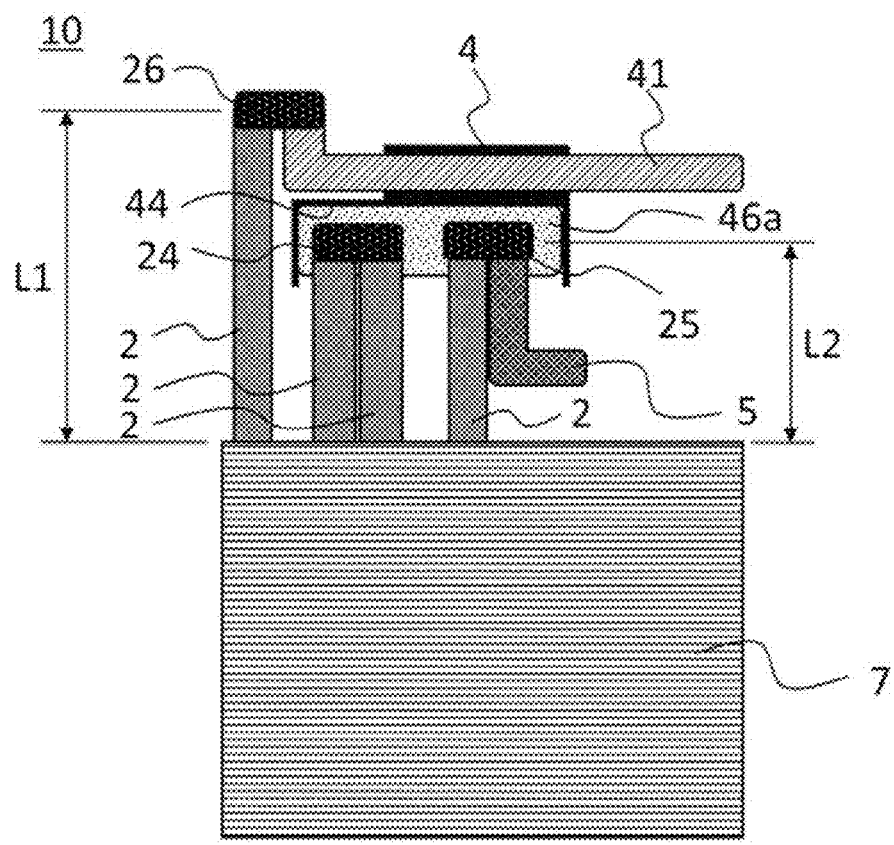
FIG. 12 is a schematic sectional view for illustrating a configuration around the wire connection plate in the armature for a rotating electric machine according to the first embodiment.

FIG. 12 is a schematic sectional view for illustrating a configuration around the wire connection plate in the armature for a rotating electric machine according to this embodiment. FIG. 12 is an illustration of a cross section of the armature core 7 taken along the axial direction. In general, the connecting portion at which the power feeding unit or the neutral point bus bar and the winding are connected to each other has a cantilever structure unlike the connecting portion at which the windings are connected to each other. Thus, in the connecting portion at which the power feeding unit or the neutral point bus bar and the winding are connected to each other, when a vibration is applied from the outside, breakage due to an increase in stress is liable to occur.

In contrast, in this embodiment, the power feeding unit 41 and the neutral point bus bar 42 are structurally integrated with each other as the wire connection plate 4. The wire connection plate 4 is rigidly fixed to the coil end portions 22b of the windings 2 by a resin member 46a. Thus, when a vibration is applied to the armature 10 from the outside, the shake of the wire connection plate 4 and the shake of the coil end portion 22b are in the same phase. Further, the power feeding unit 41 is fixed not only to the coil end portion 22b in the connecting portion 26, but also to the coil end portion 22b through intermediation of the wire connection plate 4 and the resin member 46a at another position apart from the connecting portion 26. With this, in the connecting portion 26 at which the power feeding unit 41 or the neutral point bus bar 42 and the winding 2 are connected to each other, an increase in stress is suppressed. Thus, even when a vibration is applied to the armature 10, in the connecting portion 26, sufficient bonding strength is secured. As a result, in this embodiment, the vibration resistance of the armature 10 can be improved.

Further, the connecting portion at which the joint and the winding are connected to each other similarly has a cantilever structure. In this embodiment, the connecting portion 25 at which the joint 5 and the winding 2 are connected to each other is covered by the resin member 46a. Thus, a bending moment in which displacement of the joint 5 due to the vibration affects the connecting portion 25 is suppressed. Thus, breakage in the connecting portion 25 is suppressed, and the armature 10 which is firmer and has a high vibration resistance is obtained.

Here, a distance between the connecting portion 26 and the armature core 7 is L1. A distance between the connecting portion 25 and the armature core 7 is L2. The distance L1 and the distance L2 are measured along the axial direction of the armature core 7. At this time, the distance L1 is longer than the distance L2. With this, the structure of the wire connection plate 4 can be simplified, thereby being capable of easily attaining the configuration of the wire connection plate 4.

As described above, the armature 10 for a rotating electric machine according to this embodiment includes the annular armature core 7, and the plurality of windings 2 mounted to the armature core 7. The armature core 7 includes the plurality of teeth 71. The slot 72 is formed between two teeth 71 adjacent to each other among the plurality of teeth 71. Each of the plurality of windings 2 includes the slot portions 21 and the coil end portions 22b. The slot portions 21 are accommodated in the slot 72. The coil end portions 22b are arranged on the outer side of the slot 72 in the axial direction of the armature core 7. The coil terminal 23 is formed on the coil end portion 22b. The coil terminal 23 is an end portion of each of the plurality of windings 2. The armature 10 further includes the wire connection plate 4. The wire connection plate 4 includes the power feeding unit 41 and the component 43. Power is supplied from the outside to the power feeding unit 41. The component 43 has an insulating property. The component 43 is integrated together with the power feeding unit 41. The power feeding unit 41 is joined to the coil terminal 23 of at least one winding 2 among the plurality of windings 2 through the connecting portion 26. The wire connection plate 4 is fixed to the coil end portions 22b. Here, the connecting portion 26 is an example of a first connecting portion.

In this configuration, the wire connection plate 4 is fixed to the coil end portions 22b. Thus, when a vibration is applied to the armature 10, the shake of the wire connection plate 4 and the shake of the coil end portion 22b are in the same phase. With this, an increase in stress in the connecting portion 26 is suppressed, thereby suppressing breakage of the connecting portion 26. Thus, the vibration resistance of the armature 10 can be improved.

The armature 10 for a rotating electric machine according to this embodiment further includes the joints 5. The joint 5 is configured to electrically connect two windings 2 among the plurality of windings 2 to each other. The joint 5 is joined to the coil terminal 23 of each of the two windings 2 through the connecting portion 25. The wire connection plate 4 is fixed to the connecting portions 25. Here, the connecting portion 25 is an example of a second connecting portion.

In this configuration, the connecting portion 25 at which the joint 5 and the winding 2 are joined to each other can be protected by the wire connection plate 4. With this, an increase in stress in the connecting portion 25 is suppressed, thereby suppressing breakage of the connecting portion 25. Thus, the vibration resistance of the armature 10 can be further improved.

In the armature 10 for a rotating electric machine according to this embodiment, the component 43 has the recessed portion 44 formed therein. The connecting portion 25 is accommodated in the recessed portion 44.

With this configuration, the connecting portion 25 is covered by the recessed portion 44, thereby being capable of reliably protecting the connecting portion 25 by the wire connection plate 4.

In the armature 10 for a rotating electric machine according to this embodiment, the wire connection plate 4 is fixed to the connecting portion 25 with the resin member 46a filled in the recessed portion 44.

With this configuration, the wire connection plate 4 and the connecting portion 25 are rigidly fixed to each other by the resin member 46a, thereby being capable of suppressing generation of a phase difference between the shake of the wire connection plate 4 and the shake of the coil end portion 22b. With this, an increase in stress in the connecting portion 26 can be suppressed. Further, the connecting portion 25 is covered by the resin member 46a, thereby being capable of also suppressing an increase in stress in the connecting portion 25. Thus, breakage can be suppressed in both of the connecting portion 26 and the connecting portion 25. Thus, the vibration resistance of the armature 10 can be further improved.

Further, in this configuration, the resin member 46a is filled in the recessed portion 44. With this, as compared to a method in which the entire coil end is molded by a resin, a usage amount of the resin can be reduced, and a die becomes unnecessary, thereby being capable of reducing manufacturing cost. Further, the armature 10 can be reduced in size.

In the armature 10 for a rotating electric machine according to this embodiment, the recessed portion 44 includes the plurality of chambers 44a. The plurality of chambers 44a are arrayed in the circumferential direction of the armature core 7. Two chambers 44a adjacent to each other in the circumferential direction among the plurality of chambers 44a are partitioned by the first wall 44b. The connecting portion 25 is accommodated in each of the two chambers 44a adjacent to each other in the circumferential direction.

With this configuration, the first wall 44b is provided, thereby being capable of securing insulation between the connecting portions 25 at which the winding 2 and the joint 5 are connected to each other. Further, filling of the extra resin 46 can be avoided, thereby being capable of obtaining the armature 10 with a smaller weight at low cost.

In the armature 10 for a rotating electric machine according to this embodiment, the distance L1 between the connecting portion 26 and the armature core 7 is longer than the distance L2 between the connecting portion 25 and the armature core 7. With this configuration, the configuration of the wire connection plate 4 of this embodiment can be easily attained.

In the armature 10 for a rotating electric machine according to this embodiment, the plurality of windings 2 are arranged in a wave winding manner. With this configuration, the plurality of windings 2 are arranged in a wave winding manner, thereby being capable of easily attaining the configuration of the armature 10 of this embodiment.

In the method of manufacturing the armature 10 for a rotating electric machine according to this embodiment, first, the wire connection plate 4 is mounted to the coil end portions 22b such that the connecting portions 25 are accommodated in the recessed portion 44, and the power feeding unit 41 is joined to the coil terminal 23 of at least one winding 2. Next, under a state in which the wire connection plate 4 is located below the armature core 7, the resin 46 is filled in the recessed portion 44. Next, the resin 46 is cured under a state in which the wire connection plate 4 remains located below the armature core 7 to form the resin member 46a. According to this manufacturing method, the armature 10 of this embodiment can be easily manufactured.

Second Embodiment

Figure 13:
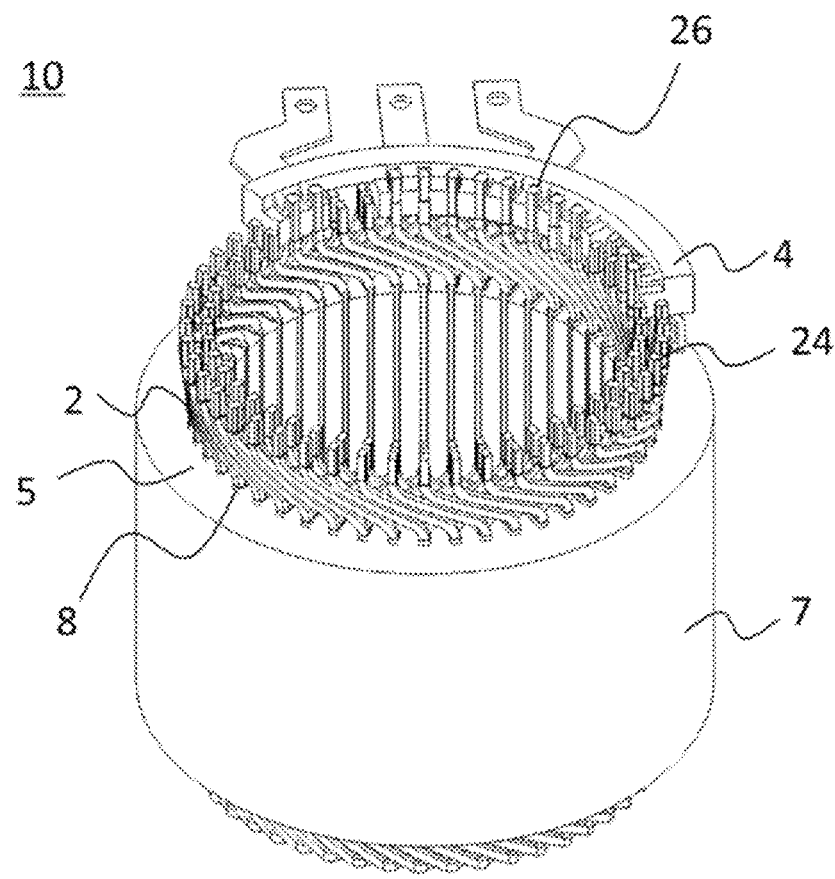
FIG. 13 is a perspective view for illustrating a configuration of an armature for a rotating electric machine according to a second embodiment.
Figure 14:
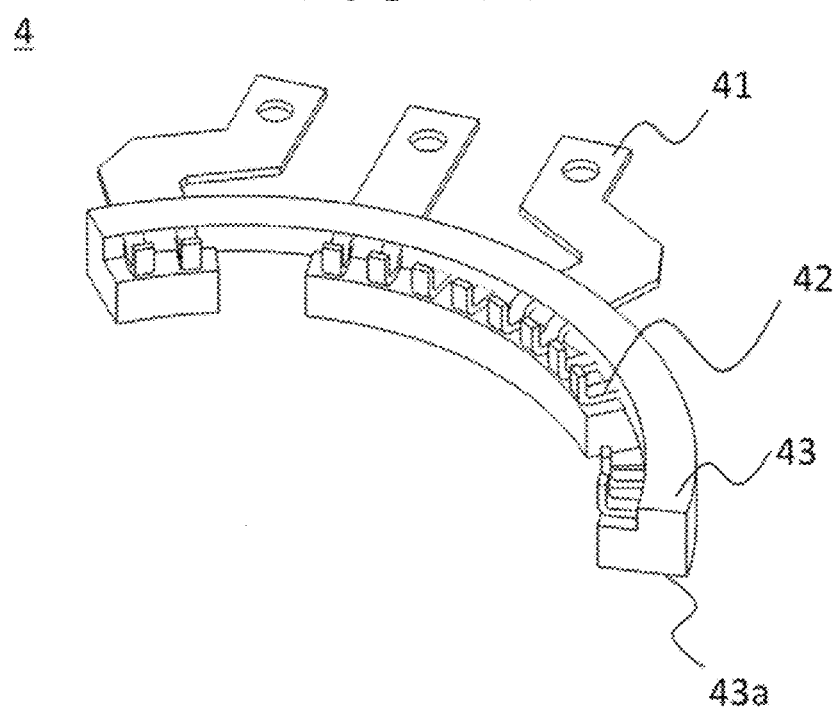
FIG. 14 is a perspective view for illustrating a configuration of a wire connection plate in the armature for a rotating electric machine according to the second embodiment.
Figure 15:
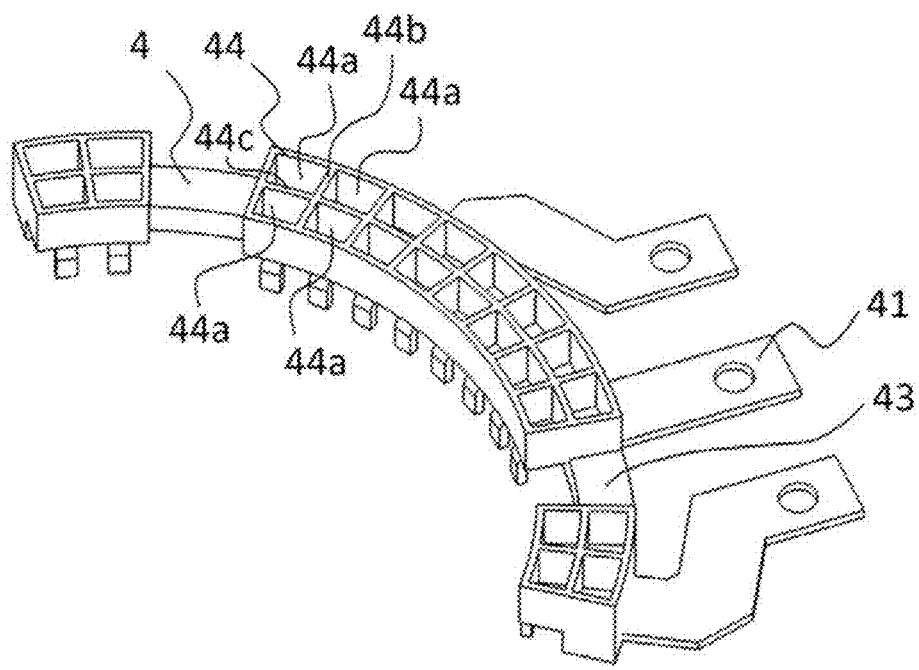
FIG. 15 is a perspective view for illustrating the configuration of the wire connection plate in the armature for a rotating electric machine according to the second embodiment.

An armature for a rotating electric machine according to a second embodiment is described. FIG. 13 is a perspective view for illustrating a configuration of the armature for a rotating electric machine according to this embodiment. FIG. 14 and FIG. 15 are perspective views for illustrating a configuration of a wire connection plate in the armature for a rotating electric machine according to this embodiment. In FIG. 14, the configuration of the wire connection plate 4 as viewed from the outer side of the armature 10 is illustrated. In FIG. 15, the configuration of the wire connection plate 4 as viewed from the coil end portion 22b side is illustrated.

As illustrated in FIG. 13 to FIG. 15, in the component 43, the recessed portion 44 including the plurality of chambers 44a is formed. The plurality of chambers 44a are arrayed in the circumferential direction and the radial direction. Two chambers 44a adjacent to each other in the circumferential direction are partitioned by the first wall 44b. Two chambers 44a adjacent to each other in the radial direction are partitioned by a second wall 44c. One connecting portion is accommodated in each chamber 44a. Each connecting portion is surrounded by walls of the chamber 44a including the first wall 44b and the second wall 44c.

The connecting portion 25 is accommodated in one of the two chambers 44a adjacent to each other in the radial direction. The connecting portion 24 is accommodated in the other of the two chambers 44a adjacent to each other in the radial direction. In this embodiment, the connecting portion 25 is accommodated in the chamber 44a located on the outer side in the radial direction, and the connecting portion 24 is accommodated in the chamber 44a located on the inner side in the radial direction. Other configurations are the same as those of the first embodiment.

Figure 16:
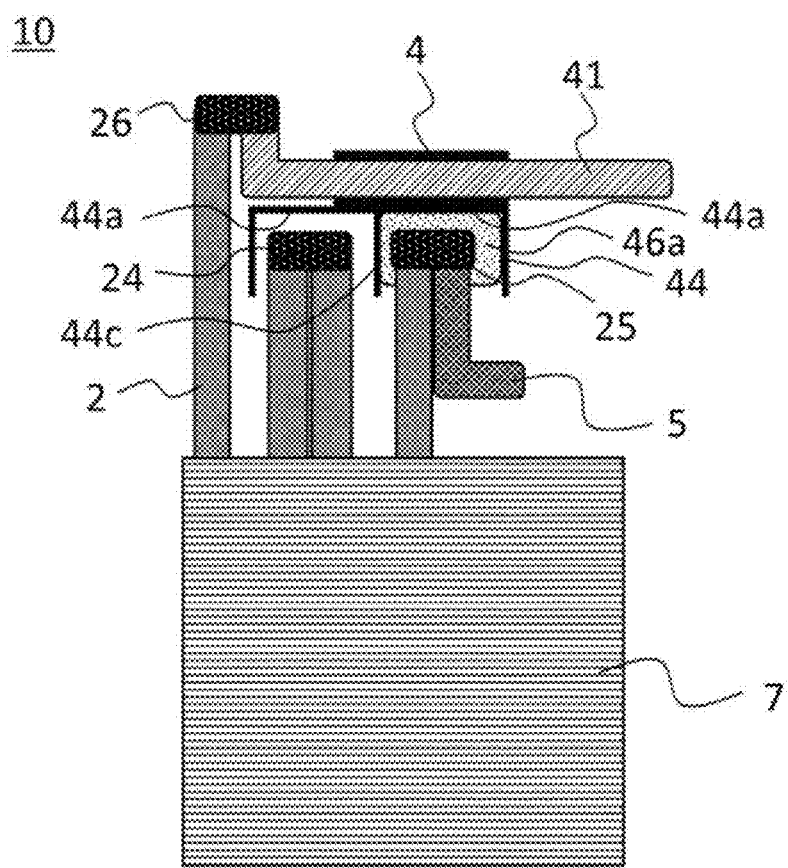
FIG. 16 is a schematic sectional view for illustrating the configuration around the wire connection plate in the armature for a rotating electric machine according to the second embodiment.

FIG. 16 is a schematic sectional view for illustrating a configuration around the wire connection plate in the armature for a rotating electric machine according to this embodiment. As illustrated in FIG. 16, the resin member 46a is filled only in the chamber 44a in which the connecting portion 25 is accommodated. With this configuration, the usage amount of the resin 46 can be reduced, thereby being capable of reducing the manufacturing cost of the armature 10. Further, the armature 10 can be reduced in weight.

As described above, in the armature 10 for a rotating electric machine according to this embodiment, the recessed portion 44 includes the plurality of chambers 44a arrayed in the radial direction of the armature core 7. Two chambers 44a adjacent to each other in the radial direction among the plurality of chambers 44a are partitioned by the second wall 44c. The connecting portion 25 is accommodated in one of the two chambers 44a adjacent to each other in the radial direction.

With this configuration, insulation between the connecting portion 25 and the connecting portion 24 other than the connecting portion 25 can be secured. Further, filling of the extra resin 46 can be avoided, thereby being capable of obtaining the armature 10 with a smaller weight at low cost.

Third Embodiment

Figure 17:
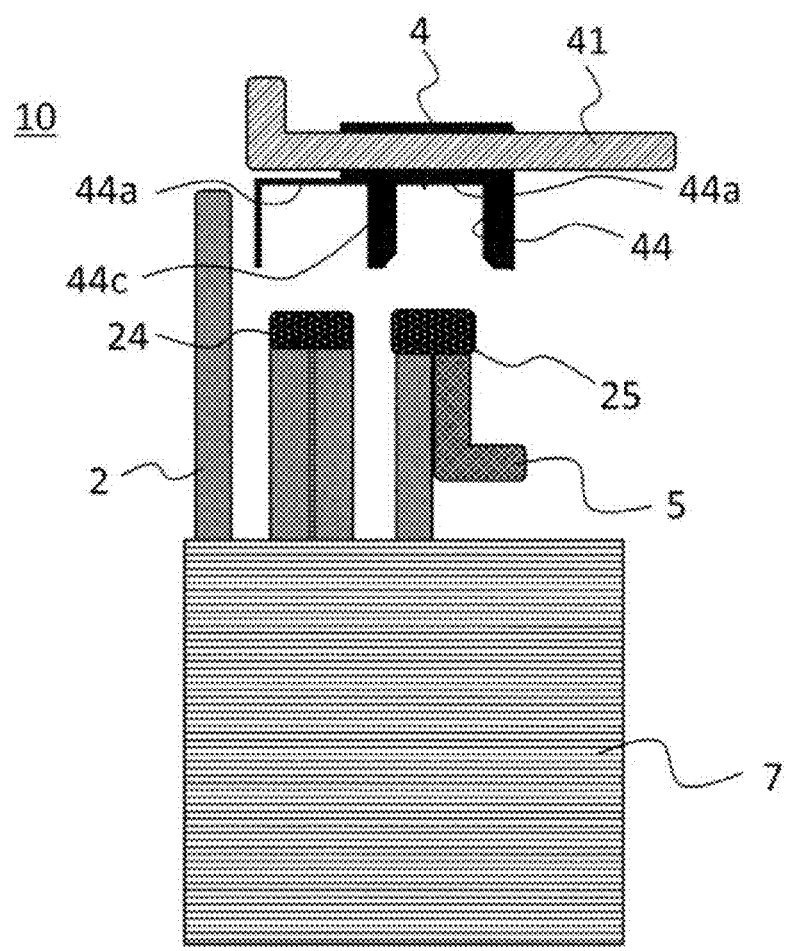
FIG. 17 is a schematic sectional view for illustrating a configuration around a wire connection plate in an armature for a rotating electric machine according to a third embodiment.
Figure 18:
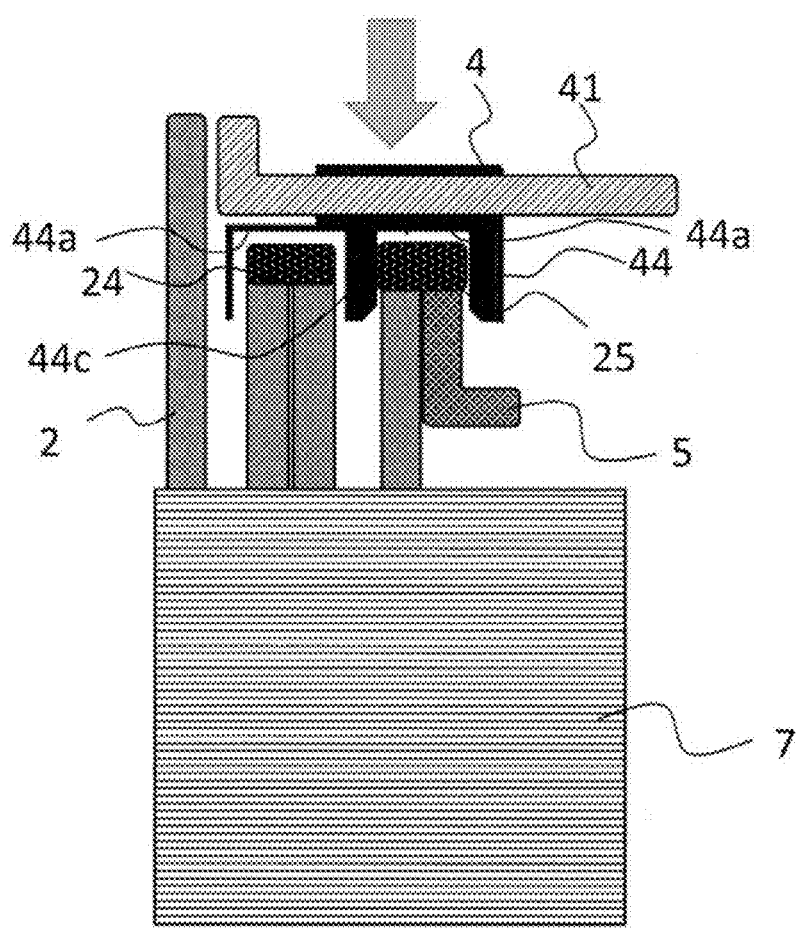
FIG. 18 is a schematic sectional view for illustrating the configuration around the wire connection plate in the armature for a rotating electric machine according to the third embodiment.

An armature for a rotating electric machine according to a third embodiment is described. FIG. 17 and FIG. 18 are schematic sectional views for illustrating a configuration around a wire connection plate in the armature for a rotating electric machine according to this embodiment. FIG. 17 is an illustration of a state before the wire connection plate 4 is fixed to the connecting portion 25 for the coil end portion 22b in manufacturing processes for the armature 10. FIG. 18 is an illustration of a state after the wire connection plate 4 is fixed to the connecting portion 25 for the coil end portion 22b in the manufacturing processes for the armature 10.

As illustrated in FIG. 17 and FIG. 18, at least the chamber 44a in which the connecting portion 25 is accommodated among the plurality of chambers 44a has a press-fit structure. That is, in a process of mounting the wire connection plate 4 to the coil end portion 22b, the connecting portion 25 is press-fitted in the chamber 44a. Other configurations are the same as those of the second embodiment.

In this embodiment, the wire connection plate 4 can be fixed to the connecting portion 25 for the coil end portion 22b without using the resin 46. Further, a furnace for curing the resin 46 is not required to be used. Thus, the armature 10 at lower cost with low environmental load can be attained.

The embodiments described above and the modifications may be carried out in various combinations.

In the description above, the preferred embodiments and the like are described in detail, but this disclosure is not limited to the embodiments described above. Various modifications and replacement can be made to the above-mentioned embodiments without departing from the scope described in the appended claims.

What is claimed is:

1. An armature for a rotating electric machine, comprising:
    an armature core having an annular shape; and
    a plurality of windings mounted to the armature core,
    wherein the armature core includes a plurality of teeth,
    wherein a slot is formed between two teeth adjacent to each other among the plurality of teeth,
    wherein each of the plurality of windings includes:
        a slot portion accommodated in the slot; and
        a coil end portion arranged on an outer side of the slot in an axial direction of the armature core,
    wherein a coil terminal which is an end portion of each of the plurality of windings is formed on the coil end portion,
    wherein the armature further comprises a wire connection plate including:
        a power feeding unit to which power is supplied from an outside; and
        a component having an insulating property and being integrated together with the power feeding unit,
    wherein the power feeding unit is joined to the coil terminal of at least one winding of the plurality of windings through a first connecting portion, and
    wherein the wire connection plate is fixed to the coil end portion, and
    wherein the power feeding unit is fixed to the coil end portion at the first connecting portion, and the power supply portion is fixed at a position that overlaps the coil end portion via the wire connection plate at another position apart from the first connecting portion.

2. The armature for a rotating electric machine according to claim 1, further comprising a joint configured to electrically connect two windings of the plurality of windings to each other,
    wherein the joint is joined to the coil terminal of each of the two windings through a second connecting portion, and
    wherein the wire connection plate is fixed to the second connecting portion.

3. The armature for a rotating electric machine according to claim 2,
    wherein a surface of the component has a recessed portion formed therein, and
    wherein the second connecting portion is accommodated in the recessed portion.

4. The armature for a rotating electric machine according to claim 3, wherein the wire connection plate is fixed to the second connecting portion with a resin member filled in the recessed portion.

5. The armature for a rotating electric machine according to claim 3,
    wherein the recessed portion includes a plurality of chambers arrayed in a circumferential direction of the armature core,
    wherein two chambers adjacent to each other in the circumferential direction among the plurality of chambers are partitioned by a first wall, and
    wherein the second connecting portion is accommodated in each of the two chambers.

6. The armature for a rotating electric machine according to claim 3,
    wherein the recessed portion includes a plurality of chambers arrayed in a radial direction of the armature core,
    wherein two chambers adjacent to each other in the radial direction among the plurality of chambers are partitioned by a second wall, and
    wherein the second connecting portion is accommodated in one of the two chambers.

7. The armature for a rotating electric machine according to claim 3, wherein a distance between the first connecting portion and the armature core is longer than a distance between the second connecting portion and the armature core.

8. The armature for a rotating electric machine according to claim 1, wherein the plurality of windings are arranged in a wave winding manner.

9. An armature for a rotating electric machine, comprising:
    an armature core having an annular shape;
    a plurality of windings mounted to the armature core; and
    a joint configured to electrically connect two windings of the plurality of windings to each other,
    wherein the armature core includes a plurality of teeth,
    wherein a slot is formed between two teeth adjacent to each other among the plurality of teeth,
    wherein each of the plurality of windings includes:
        a slot portion accommodated in the slot; and
        a coil end portion arranged on an outer side of the slot in an axial direction of the armature core,
    wherein a coil terminal which is an end portion of each of the plurality of windings is formed on the coil end portion
    wherein the armature further comprises a wire connection plate including:
        a power feeding unit to which power is supplied from an outside; and
        a component having an insulating property and being integrated together with the power feeding unit,
    wherein the power feeding unit is joined to the coil terminal of at least one winding of the plurality of windings through a first connecting portion,
    wherein the wire connection plate is fixed to the coil end portion, wherein the joint is joined to the coil terminal of each of the two windings through a second connecting portion,
wherein the wire connection plate is fixed to the second connecting portion,
wherein a surface of the component has a recessed portion formed therein,
wherein the second connecting portion is accommodated in the recessed portion,
wherein the recessed portion includes a plurality of chambers arrayed in a circumferential direction or a radial direction of the armature core, and
wherein the second connecting portion is accommodated in any one of the plurality of chambers.

10. The armature for a rotating electric machine according to claim 9,
wherein when the recessed portion includes a plurality of chambers arrayed in a circumferential direction of the armature core,
wherein two chambers adjacent to each other in the circumferential direction among the plurality of chambers are partitioned by a first wall, and
wherein the second connecting portion is accommodated in each of the two chambers.

11. The armature for a rotating electric machine according to claim 9,
wherein the recessed portion includes a plurality of chambers arrayed in a radial direction of the armature core,
wherein two chambers adjacent to each other in the radial direction among the plurality of chambers are partitioned by a second wall, and
wherein the second connecting portion is accommodated in one of the two chambers.

12. A method of manufacturing an armature for a rotating electric machine, the armature for a rotating electric machine comprising:
an armature core having an annular shape;
a plurality of windings mounted to the armature core, and
a joint configured to electrically connect two windings of the plurality of windings to each other,
wherein the armature core includes a plurality of teeth,
wherein a slot is formed between two teeth adjacent to each other among the plurality of teeth,
wherein each of the plurality of windings includes:
a slot portion accommodated in the slot; and
a coil end portion arranged on an outer side of the slot in an axial direction of the armature core,
wherein a coil terminal which is an end portion of each of the plurality of windings is formed on the coil end portion,
wherein the armature further comprises a wire connection plate including:
a power feeding unit to which power is supplied from an outside; and
a component having an insulating property and being integrated together with the power feeding unit,
wherein the power feeding unit is joined to the coil terminal of at least one winding of the plurality of windings through a first connecting portion,
wherein the wire connection plate is fixed to the coil end portion,
wherein the joint is joined to the coil terminal of each of the two windings through a second connecting portion,
wherein the wire connection plate is fixed to the second connecting portion,
wherein a surface of the component has a recessed portion formed therein,
wherein the second connecting portion is accommodated in the recessed portion,
wherein the wire connection plate is fixed to the second connecting portion with a resin member filled in the recessed portion,
the method comprising:
mounting the wire connection plate to the coil end portion such that the second connecting portion is accommodated in the recessed portion, and joining the power feeding unit to the coil terminal of the at least one winding;
filling a resin in the recessed portion under a state in which the wire connection plate is located below the armature core; and
curing the resin under a state in which the wire connection plate remains located below the armature core to form the resin member.

* * * * *